US011502569B2

(12) United States Patent
Gabrys et al.

(10) Patent No.: US 11,502,569 B2
(45) Date of Patent: Nov. 15, 2022

(54) HIGH EFFICIENCY ELECTRIC MACHINE

(71) Applicants: Christopher W. Gabrys, Reno, NV (US); Timothy S. Rodgers, Bainbridge Island, WA (US)

(72) Inventors: Christopher W. Gabrys, Reno, NV (US); Timothy S. Rodgers, Bainbridge Island, WA (US)

( * ) Notice: Subject to any disclaimer, the term of this patent is extended or adjusted under 35 U.S.C. 154(b) by 162 days.

(21) Appl. No.: 16/989,646

(22) Filed: Aug. 10, 2020

(65) Prior Publication Data

US 2021/0006116 A1    Jan. 7, 2021

Related U.S. Application Data

(63) Continuation of application No. PCT/US2017/054080, filed on Sep. 28, 2017, and a continuation-in-part of application No. 15/768,925, filed on Apr. 17, 2018, now Pat. No. 10,749,419.

(60) Provisional application No. 62/984,200, filed on Mar. 2, 2020.

(51) Int. Cl.
| | |
|---|---|
| *H02K 3/28* | (2006.01) |
| *H02K 3/47* | (2006.01) |
| *H02K 1/02* | (2006.01) |
| *H02K 21/14* | (2006.01) |
| *H02K 21/24* | (2006.01) |

(52) U.S. Cl.
CPC ............... *H02K 3/47* (2013.01); *H02K 1/02* (2013.01); *H02K 3/28* (2013.01); *H02K 21/14* (2013.01); *H02K 21/24* (2013.01)

(58) Field of Classification Search
CPC .. H02K 1/02; H02K 1/12; H02K 3/28; H02K 3/47; H02K 21/14; H02K 21/222
See application file for complete search history.

(56) References Cited

U.S. PATENT DOCUMENTS

| | | | |
|---|---|---|---|
| 7,525,230 B1 * | 4/2009 | Gabrys | ................. H02K 21/14 310/260 |
| 7,902,700 B1 * | 3/2011 | Gabrys | ............... H02K 11/014 310/156.83 |

* cited by examiner

*Primary Examiner* — Dang D Le
(74) *Attorney, Agent, or Firm* — J. Michael Neary

(57) ABSTRACT

An electric machine for converting between electrical and rotary mechanical energy includes a rotor journaled to rotate about an axis of rotation, and a stationary stator mounted adjacent to the rotor. The stator has a ferromagnetic backiron with a surface facing the rotor across a magnetic airgap and having windings applied in a winding pattern formed directly onto the stator backiron and adhered to its surface with a pre-applied tacky adhesive. The windings magnetically exert torque upon the rotor across the magnetic armature airgap in response to electric power applied to the windings. The rotor has permanent magnets that generate magnetic flux across the airgap and through the windings. The windings are comprised of pre-bundled multiple individually insulated conductor strands that are electrically connected in parallel but are electrically insulated from each other along their lengths inside said magnetic armature airgap.

20 Claims, 15 Drawing Sheets

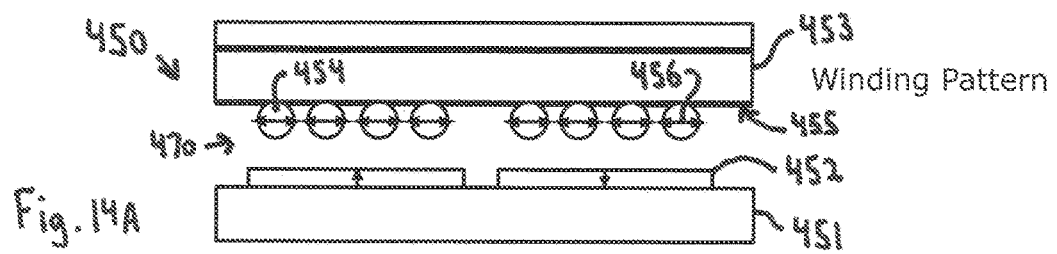
Fig. 14A — Winding Pattern
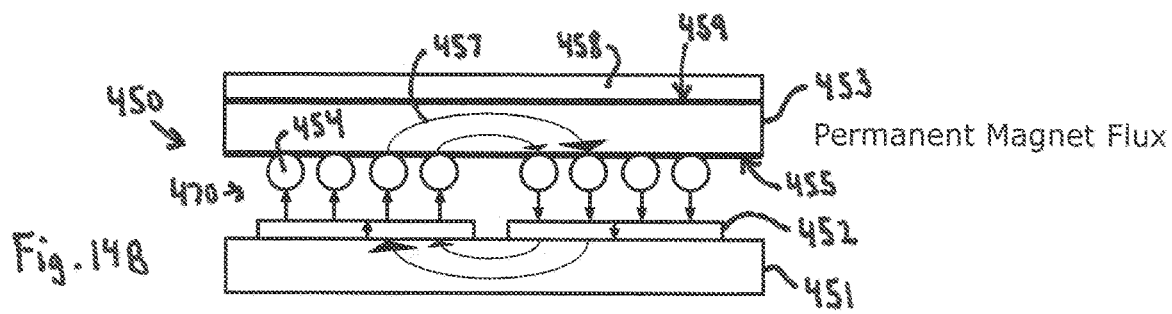
Fig. 14B — Permanent Magnet Flux
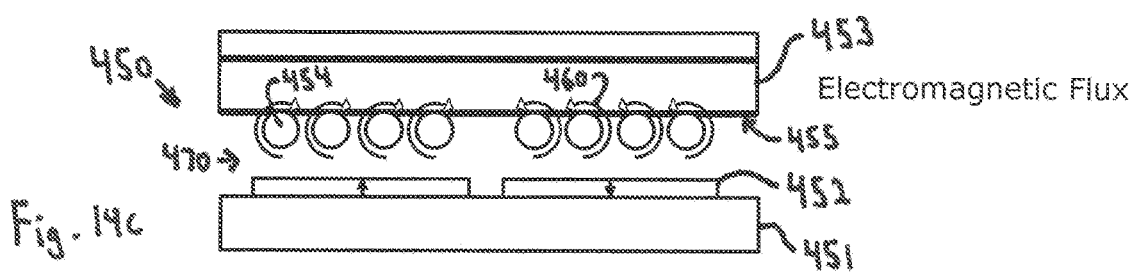
Fig. 14C — Electromagnetic Flux
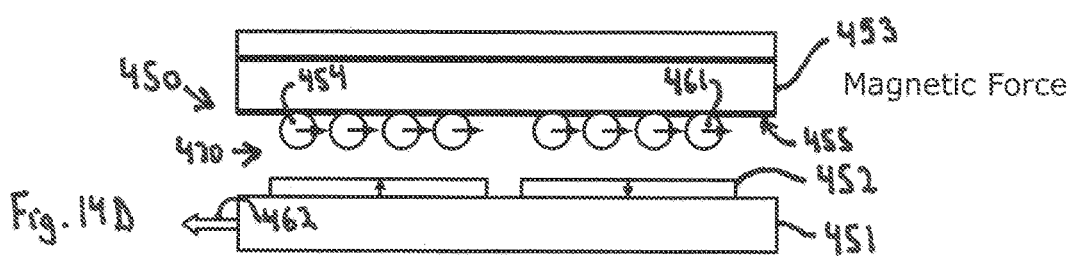
Fig. 14D — Magnetic Force
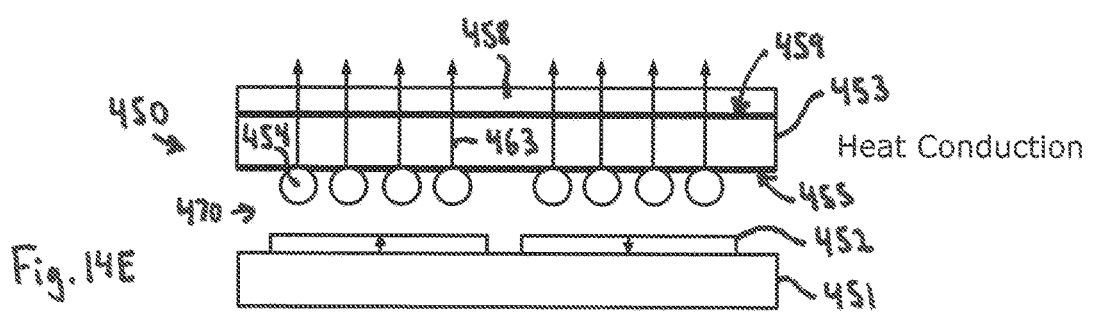
Fig. 14E — Heat Conduction

HIGH EFFICIENCY ELECTRIC MACHINE

This invention pertains to electric machines for converting between electrical and mechanical energy, and more particularly to an electric machine that provides higher efficiency power conversion with reduced materials and manufacturing costs.

BACKGROUND OF THE INVENTION

There is much effort presently being undertaken to develop new electric motors and generators that can provide higher efficiency power conversion between electrical and rotary mechanical energy. Simultaneously, efforts are also focused on reducing the amount of materials utilized and reducing manufacturing costs, while attaining higher efficiency. New electric machines that can achieve higher power conversion efficiency, but are more costly than current traditional machines, are less likely to be well-accepted into the marketplace if at all. The industry-wide goal is to provide higher efficiency and also have lower costs.

Development on new electric motors for achieving higher efficiency is mostly focused on use of synchronous topologies, which require the use of a variable frequency inverter to operate. Use of electronic inverters is also becoming commonplace as a means to increase operational efficiency with all motors by varying the rotational speed, which supports the emergence of new synchronous motors. Permanent magnet synchronous motors can potentially provide the highest possible efficiencies and without cogging vibrations and noise associated with reluctance type motors, depending on the design. Unfortunately to date, high efficiency permanent magnet motors have required too much costly magnet material and/or expensive windings and stator constructions/manufacturing.

Accordingly, a new high efficiency electrical machine is needed that can both provide higher efficiency and simultaneously achieve reduced materials and manufacturing costs.

SUMMARY OF THE INVENTION

The invention provides an air core motor-generator with unique construction that provides both higher operating efficiency and reduced costs. One of the key drivers for electric machine costs is the amount of materials utilized in construction. The new electric machines can provide up to an 80% reduction in total weight compared with current conventional electric motors and generators today. A second cost driver is the expenses associated with the manufacturing process, and these new motor-generators also allow greatly simplified and higher production rate capability than with traditional electric machines.

The invention provides an electric machine for converting between electrical and rotary mechanical energy comprising a rotor and a stator, wherein the rotor is journaled to rotate about an axis of rotation, the stator is stationary adjacent to the rotor and magnetically exerts torque upon the rotor across a magnetic armature airgap in response to applied electric power. The rotor comprises permanent magnets that generate magnetic flux across the magnetic armature airgap and through air core armature windings that are adhered to a slotless ferromagnetic stator backiron ring on a surface thereof facing the magnetic airgap. The air core armature windings are comprised of pre-bundled multiple individually insulated conductor strands that are electrically connected in parallel but are electrically insulated from each other along their lengths inside the magnetic airgap. The conductor strands are enclosed by a serve that holds the strands together and the serve of the windings is bonded to the armature airgap surface of stator backiron. The stator backiron ring is assembled from individual arc pieces prior to adhering the air core armature windings to the backiron. The stator back iron is coupled to a support for transfer of torque to the support, wherein the support provides a higher magnetic reluctance to the magnetic flux in the circumferential direction than the stator back iron.

Preferably, the electric machine utilizes a very high magnetic pole count, such as between 30 and 50. This reduces the magnetic pole arc length which in turn reduces the magnetic flux amount that must be conducted between adjacent magnetic poles in both the stator backiron ring and in the rotor. The end result is that both the stator backiron ring may be made much thinner as well as the rotor backiron, dramatically reducing the weight of the electric machine. A deficiency though is that the fundamental magnetic flux frequency conducted circumferentially through the stator backiron can be increased from 60-120 Hz in conventional motor-generators to 1000-2000 Hz or higher. This can result in high magnetic induced eddy current and hysteresis losses, substantially lowering operating efficiency.

To overcome higher potential losses, the stator backiron ring may be constructed from thinner than normal electrical steel laminations such as 0.008" thick non-oriented silicon steel. Alternately, the stator backiron ring may be formed from powdered ferromagnetic material. This also allows construction of axial gap or pancake electrical machines. In an additional embodiment of the invention, the arc pieces are formed from pressed ferromagnetic powder comprised predominately of iron. Powdered iron in a polymer binder is one construction, however we have found that this material can result in higher than desirable magnetic induced losses in the stator backiron. We have found that surprisingly the addition of other non-ferromagnetic materials in the powder material surprisingly can dramatically reduce magnetic losses by an additional factor of up to several times depending on the design without significantly increasing material costs. In a further embodiment, the pressed ferromagnetic powder additionally comprises aluminum. One such alloy material is an alloy of iron, silicon and aluminum, known as Sendust. Surprisingly, it also provides a 2.9 times higher thermal conductivity than non-oriented silicon steel laminations in the in plane direction as well, for cooler and more efficient operation allowing the heat to conducted from the air core armature windings. The deficiencies of alloys like Sendust that have typically excluded their use in electric machines are much lower magnetic permeability as well as brittle nature. However, for the electric machines in accordance with the invention, the air core construction cooperates by using a much larger magnetic airgap (for placement of the windings inside the magnetic airgap) than conventional slot wound electric machines. This makes the lower magnetic permeability in the circumferential flux direction in the stator backiron ring much less significant portion as a total flux path reluctance. Equally, the air core construction utilizes a simple stator backiron ring, without pole teeth making the brittle nature, also much less important. Because the magnetic relative permeability of the powdered iron constructions can be on the order of only 100, the stator support needs to provide a higher reluctance in the circumferential direction than the stator backiron ring, so that the flux preferably travels circumferentially in low loss powdered iron. The stator support can be constructed from non-ferromagnetic materials, such as aluminum or austenitic types of stainless steel, for example. Alternatively, a magnetic insulating material or airgap structure can be employed such that the flux preferably travels circumferentially through the stator backiron ring.

In an additional embodiment, the air core windings are applied to the stator backiron through a pre-applied adhesive on the armature airgap surface. Preferably the pre-applied adhesive is already tacky during the winding application to the stator backiron so that the adhesive holds the the windings in the winding pattern during the winding process and subsequently in the transfer of electromagnetically induced torque during operation of the electric machine. This can facilitate high rate production manufacture of the stator, which is slotless.

In some cases, it can be desirable to preclude vibration between conductor strands where not bonded to the stator backiron ring. Particularly, this occurs and the end turns which preferably overlap of different phases outside the magnetic armature airgap. In a further embodiment, the individually insulated conductor strands comprise a self-bonding top coat adhesive wherein when activated the strands are bonded with each other inside the serve but not with adjacent winding turns.

In addition to preventing vibrations between strands at end turn locations, the use of the self-bonding coating can also facilitate a thinner magnetic armature airgap. In yet a further embodiment, the air core windings are pressed against the stator backiron when the self-bonding coating is activated. The bundle of conductor strands can be resilient and bonding while compressed across the magnetic armature airgap direction can allow solidifying the windings to be in a thinner layer.

We have found that they highest performance construction per cost, particularly of the required permanent magnets is achieved by minimized the thickness of the magnetic armature airgap. In yet an additional embodiment, the air core windings comprise multiple phases which lie in a single layer against the stator backiron in portions where inside the magnetic armature airgap. This also conveniently bonds all active length portions of the multiple phases to the stator backiron ring for transfer of electromagnetically induced torque during operation.

In additional embodiments, the invention provides an electric machine for converting between electrical and rotary mechanical energy comprised of a rotor and a stator wherein the rotor is journalled to rotate about an axis of rotation, and the stator is stationary adjacent to the rotor and magnetically exerts torque upon the rotor across a magnetic armature airgap in response to applied electric power. The rotor comprises permanent magnets that generate magnetic flux across the magnetic armature airgap and through air core stator windings that are bonded in to a ferromagnetic stator backiron on the surface thereof facing the magnetic armature airgap. The air core armature windings are comprised of pre-bundled multiple individually insulated conductor strands that are electrically connected in parallel but are electrically insulated from each other along their lengths inside the magnetic armature airgap. The air core armature windings are bonded to the armature airgap surface of the stator backiron. The stator backiron provides five functions; transfers heat generated by armature winding resistive losses by thermal conduction in the direction away from the magnetic armature airgap, transfers electromagnetically induced torque on the armature windings through adhesive shear to a stator backiron support, conducts magnetic flux circumferentially between rotating magnetic poles, conducts part of the magnetic flux path around individual armature windings which increases inductance, and holds the armature windings in the winding pattern during application through adhesion to a pre-applied adhesive layer.

Because of a high pole count, preferably employed in accordance with the invention, the stator backiron may be exceptionally thin, in the radial direction for radial gap electric machines. In some designs of a give size, the radial thickness need only be 3 mm thickness. In that case, it can become easier and less wasteful and/or costly to form the stator backiron from multiple arc segments as opposed to a complete unitary ring. In a further embodiment, the stator backiron is formed from individual arc pieces, wherein the arc pieces are assembled into a slotless ring prior to adhering the air core armature windings. This can also provide for minimized electrical connections by having individual phases being wound continuously about the assembled diameter.

In yet a further embodiment, the invention provides an electric machine for converting between electrical and rotary mechanical energy comprised of a rotor and a stator wherein the rotor is journalled to rotate about an axis of rotation, and the stator is stationary adjacent to the rotor and magnetically exerts torque upon the rotor across a magnetic armature airgap in response to applied electric power. The rotor comprises permanent magnets that generate magnetic flux across the magnetic armature airgap and through air core stator windings that are bonded in to a ferromagnetic stator backiron on the surface thereof facing the magnetic armature airgap. The air core armature windings are comprised of pre-bundled multiple individually insulated conductor strands that are electrically connected in parallel but are electrically insulated from each other along their lengths inside the magnetic armature airgap. The air core armature windings are bonded to the armature airgap surface of stator backiron. The stator backiron transfers heat generated by armature winding resistive losses by thermal conduction in the direction away from the magnetic armature airgap, transfers electromagnetically induced torque on the armature windings through adhesive shear to a stator backiron support, conducts magnetic flux circumferentially between rotating magnetic poles, and is supported by a support to transfer torque that provides a higher magnetic reluctance to said magnetic flux in the circumferential direction than the stator back iron.

DESCRIPTION OF THE DRAWINGS

The invention and its many advantages and features will become better understood upon reading the following detailed description of the preferred embodiments in conjunction with the following drawings, wherein:

FIGS. 14A-14E are schematic drawings of a circumferential portion section of rotor and stator illustrating the five different functions of the stator backiron of a high efficiency electric machines in accordance with the invention.

DESCRIPTION OF THE PREFERRED EMBODIMENT

Figure 1:
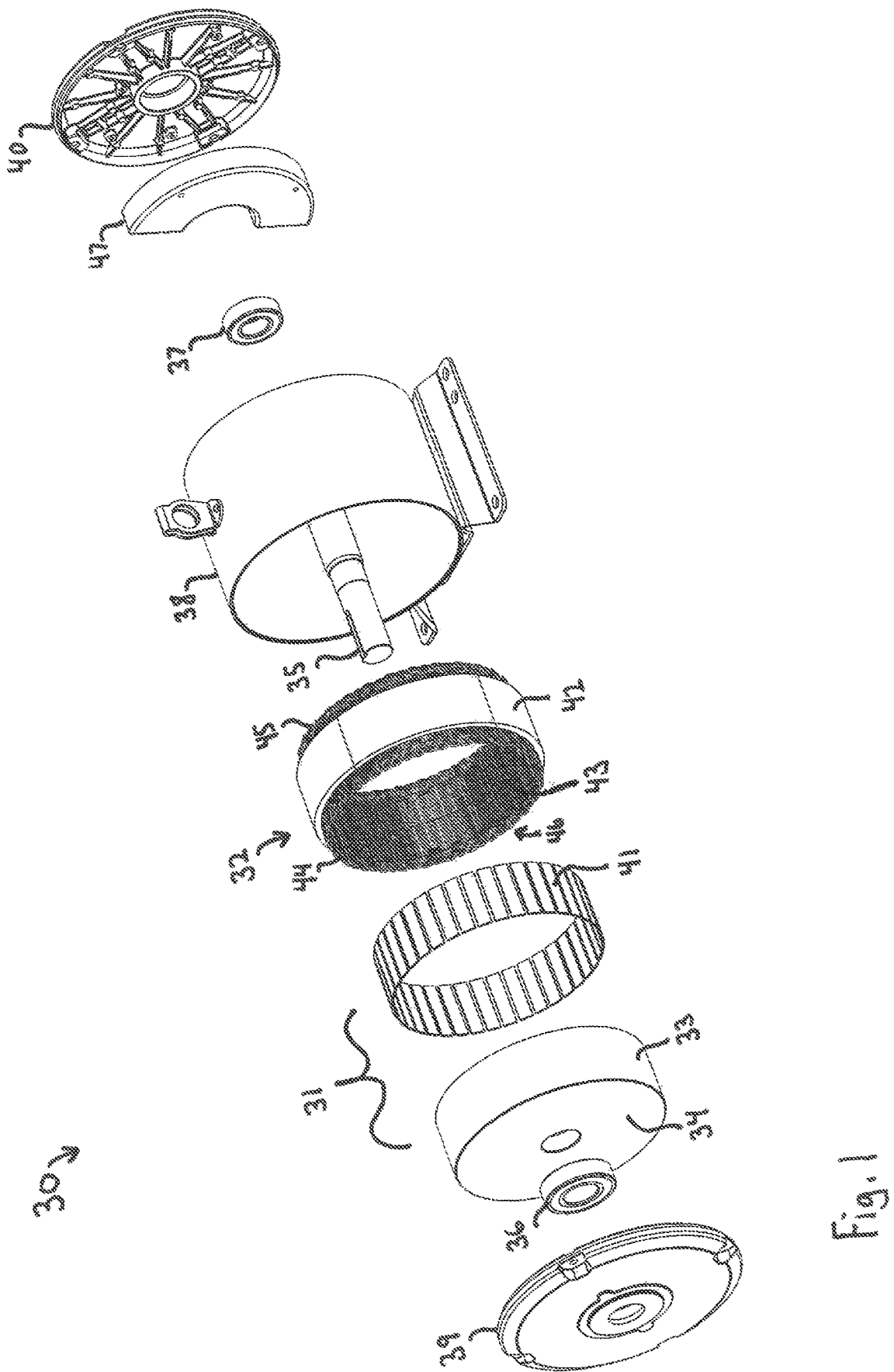
FIG. 1 is an exploded isometric view drawing of a high efficiency radial gap, inner rotor electric machine in accordance with the invention.

Turning to the drawings, wherein like reference characters designate identical or corresponding parts, FIG. 1 shows an exploded isometric view drawing of a high efficiency electric machine in accordance with the invention. The electric machine 30 may be used as a motor or a generator but is operated as a motor as shown. The motor 30 comprises a rotor 31 and a stator 32. The rotor 31 comprises a rotor backiron tube 33 and hub section 34 that connects to center shaft 35. The shaft 35 is journaled by bearings 36 and 37 that are supported by housing endplates 39 and 40. The end plates 39, 40 are connected to the outer housing 38. The outer housing tube 38 also comprises the support for a stator backiron 42 that transfers torque. An array of alternating polarity permanent magnets 41 on the outside surface of the rotor backiron tube 33, typically radial or Halbach variations, drives magnetic flux through the rotor backiron 33 and back and forth across an airgap between the magnets 41 on the rotor 31 and a stator backiron 42 of the stator 32. The stator 32 is comprised of an outer stator backiron 42 with inner armature windings 46. The stator backiron 42 is a thin ring constructed from magnetic loss mitigating material and structure such as laminated silicon steel or pressed ferromagnetic powder. The windings 46 are wound from bundled multiple individually insulated conductor strands that are electrically connected in parallel but are electrically insulated between each other where located inside magnetic airgap of the motor 30. This construction includes Litz wire and it precludes development of significant eddy current losses. The windings 46 are adhered directly to the smooth inner diameter of the stator backiron 42 by application of structural film adhesive and depositing the wire directly to the film adhesive in the winding pattern for torque production. To aid in manufacturing of the radial thin wall ring 42, it is constructed from multiple individual arc segments that are assembled together to form the ring prior to adhering the windings 46. The adhesive holds the winding pattern in the windings 46 as they are being formed and adhered to the stator backiron in progression. The windings 46 preferably comprise active lengths 43 that generate back emf from magnetic flux as the rotor 31 rotates and end turns 44, 45 that run circumferentially. The stator magnetically exerts torque upon the rotor across the magnetic armature airgap in response to electric power applied to the windings. Preferably the active lengths 43 of all phases of windings 46 lie in a single layer against the film adhesive bonded to the stator backiron 42. Although helical winding patterns could be used, they are less desirable because the circumferential components (technically considered end turns) would be located in the magnetic flux requiring a larger than necessary magnetic airgap and more magnet material usage.

Figure 2:
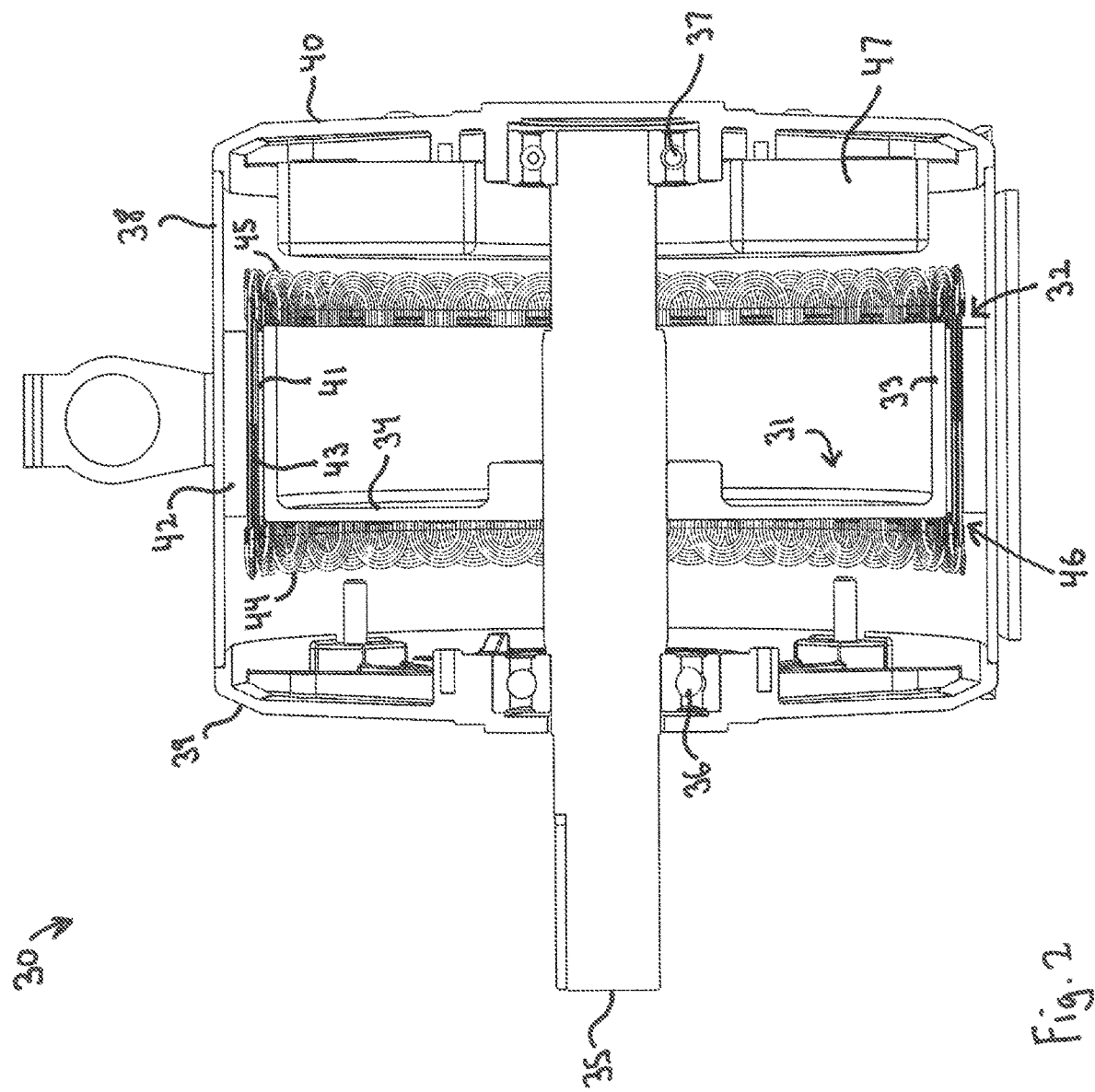
FIG. 2 is a side view drawing of the high efficiency electric machine of FIG. 1.

A sectional elevation view drawing of the high efficiency electric machine of FIG. 1 is shown in FIG. 2. The motor 30 is comprised of the rotor 31 and stator 32. The rotor 32 is formed from steel with a rotor backiron section 33 that conducts magnetic flux circumferentially between alternating radial permanent magnets 41. The magnets 41 are bonded to the outside circumference of the rotor backiron section 33, defining a radial magnetic airgap between the rotor backiron tube 33 and the stator backiron 42. To minimize the required amount of materials and resistive losses, the number of magnetic poles 41 is preferably more than 24 and more preferably around 50. The hub 34 is press fit onto the shaft 35 that is supported for rotation by bearings 36, 37. The housing endplates 39, 40 hold the bearings 36, 37 and connect to outer housing tube 38. The stator 32 is bonded into the inside of the housing tube 38 and is comprised of a stator backiron 42 with bonded internal windings 46. The stator backiron is constructed from multiple arc segments of Sendust (compressed powdered alloy of iron, silicon and aluminum) for low hysteresis and eddy current losses at the much higher than typical operating frequency of the motor. The windings 46 are wound into a serpentine pattern directly adhered to the inner diameter of the stator backiron 42 through use of an already tacky film adhesive providing instantaneous adhesion. This allows for very high speed automated stator construction. The windings 46 comprise three phases with axial active lengths 43 all located in a single layer and adhered to the stator backiron 42, and overlapping end turns 44, 45 axially beyond the rotor and stator backirons 33, 42 outside of the flux from the permanent magnets 41. The windings are energized by a synchronous inverter electronic drive 47, shown in FIG. 12, also located inside the housing tube 38.

Figure 3:
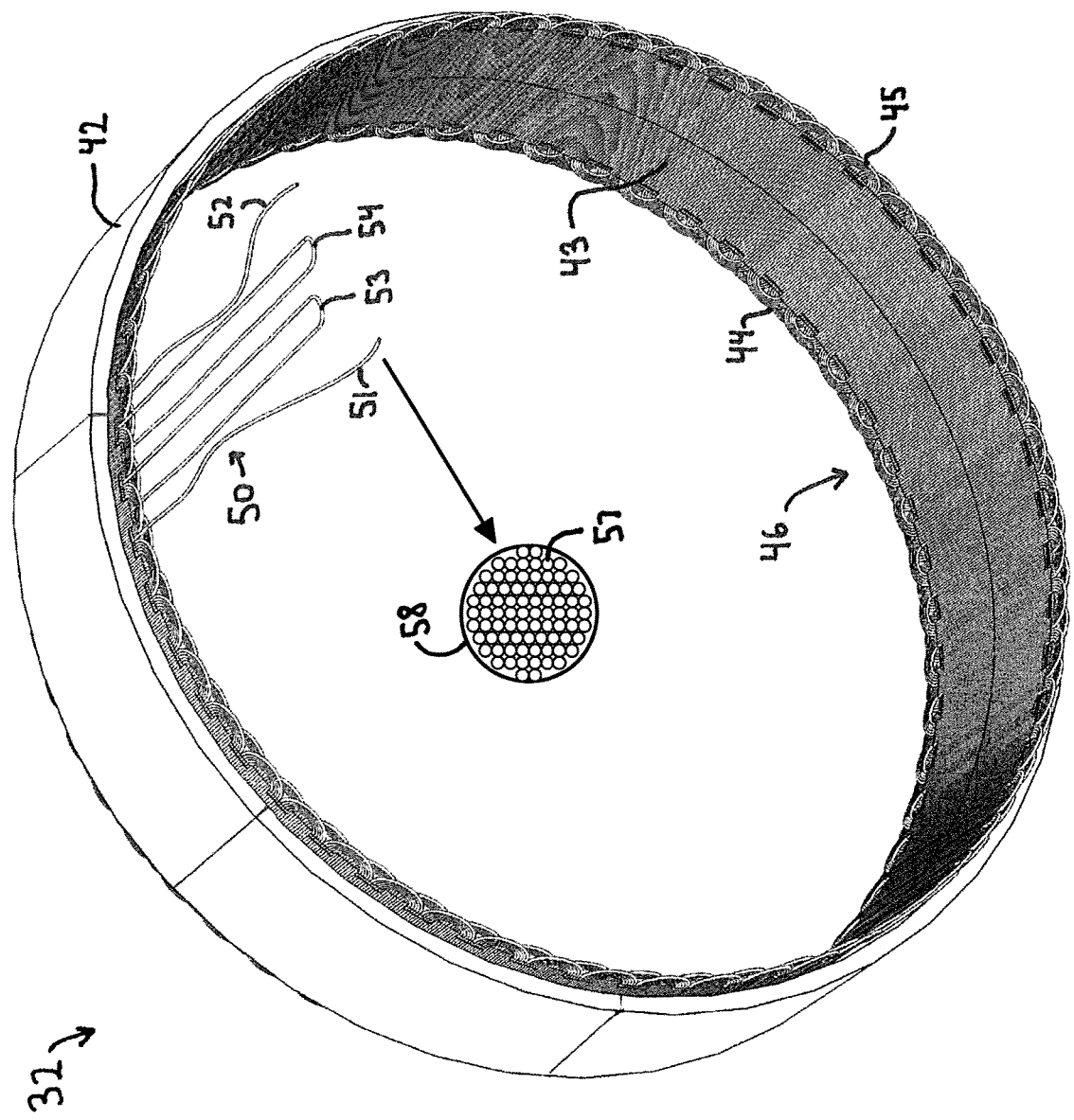
FIG. 3 is an isometric view drawing of the stator (after winding) of the high efficiency electric machine of FIG. 1.

An isometric view drawing of the stator (after winding) of the high efficiency electric machine of FIG. 1 is shown in FIG. 3. The stator 32 is comprised of a stator backiron 42 and flexible wire armature windings 43 comprised of bundled multiple individually insulated strands that are electrically connected in parallel but are electrically insulated between each other where located within the changing magnetic flux. The stator backiron 42 may be constructed of a single unitary thin ring or more preferably for larger electric machines from multiple arc segments that are assembled together, as shown. The stator backiron 42 is formed from compressed ferromagnetic powder comprising iron, and more preferably also including silicon and aluminum for achieving lowest losses. The three phase windings 43 are formed directly on the smooth inner surface of the stator backiron 42 by adhering the wire into serpentine winding patterns as the wire is traversed into the pattern around the circumference. The stator may be oven cured to increase the bond strength so that it can reliably transfer electromagnetic force between the wires 46 and stator backiron 42 during operation of the motor 30. For some applications, the wire strands may also be pre-coated with a self-bondable thermoplastic topcoat and wires compressed against the stator backiron 42 by a removable compression device such as a bladder or otherwise expandable ring while heated to compress the wire shape. As shown, all three phases of windings 46 are wound continuously forming leads 50 that comprise only two ends 51, 52 and two transition loops 53, 54 where transition between phases. The continuous windings 46 simplify the automated winding process. The end turns 44, 45 which traverse circumferentially and must necessarily occupy at least two layers are outside of the active length area 43 so that the radial thickness of the magnetic airgap in the motor 30 can be minimized.

Figure 4:
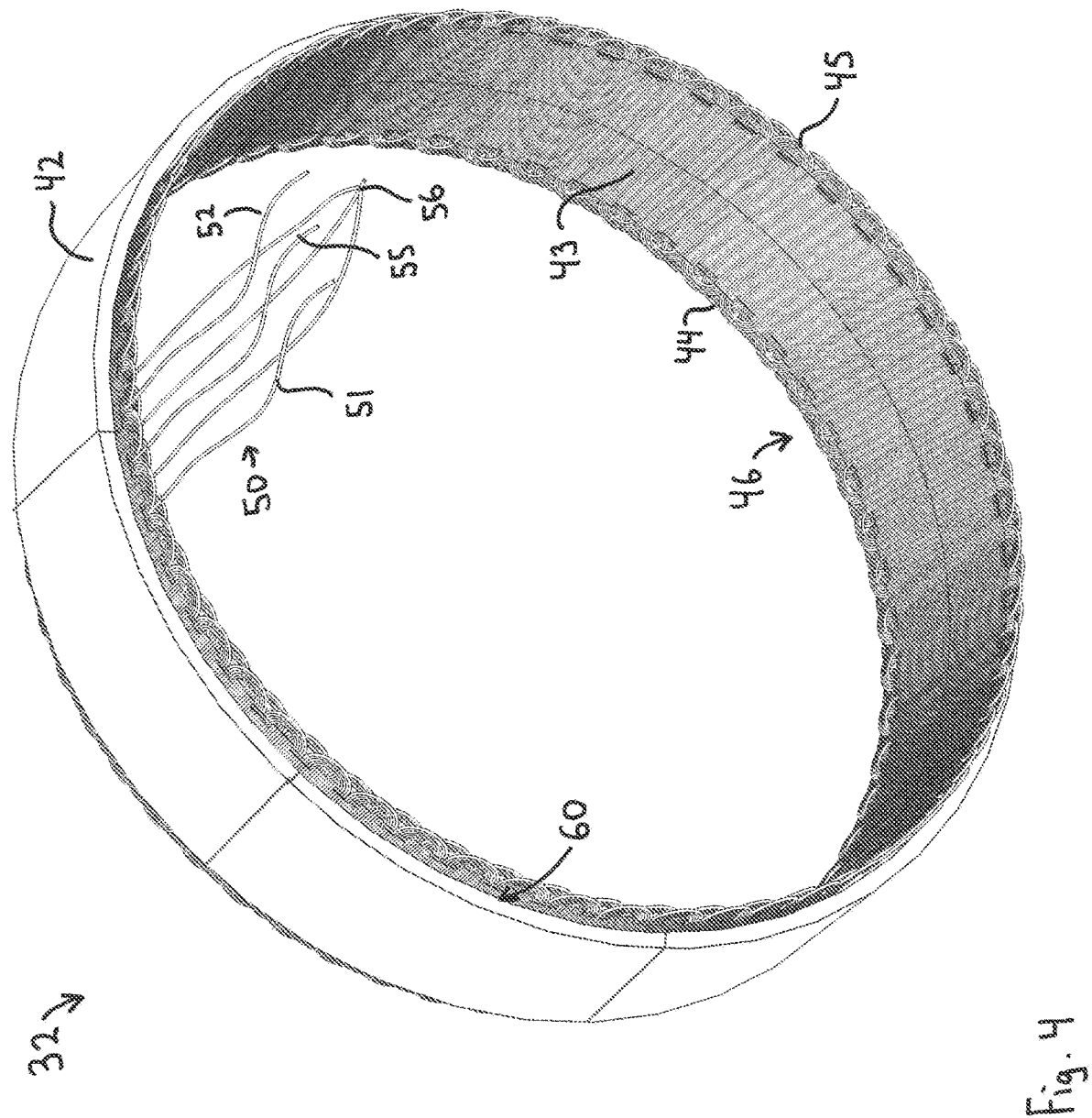
FIG. 4 an isometric view drawing of the stator (after windings connected into three phases) of the high efficiency electric machine of FIG. 1.

An isometric view drawing of the stator (after windings connected into three phases) of the high efficiency electric machine of FIG. 1 is in shown FIG. 4. After winding (adhering the windings 46 in the winding pattern with the adhesive resisting winding forces to hold the winding pattern to the stator backiron 42) and post curing the B-staged epoxy film adhesive to increase strength for transfer of shear force during operation, the leads 50 are further prepared. The transition loops 53, 64 are subsequently cut to separate the individual phases and 3 leads connected together to form a wye center connection 56 along with three phase leads 51, 52, 55.

Figure 5:
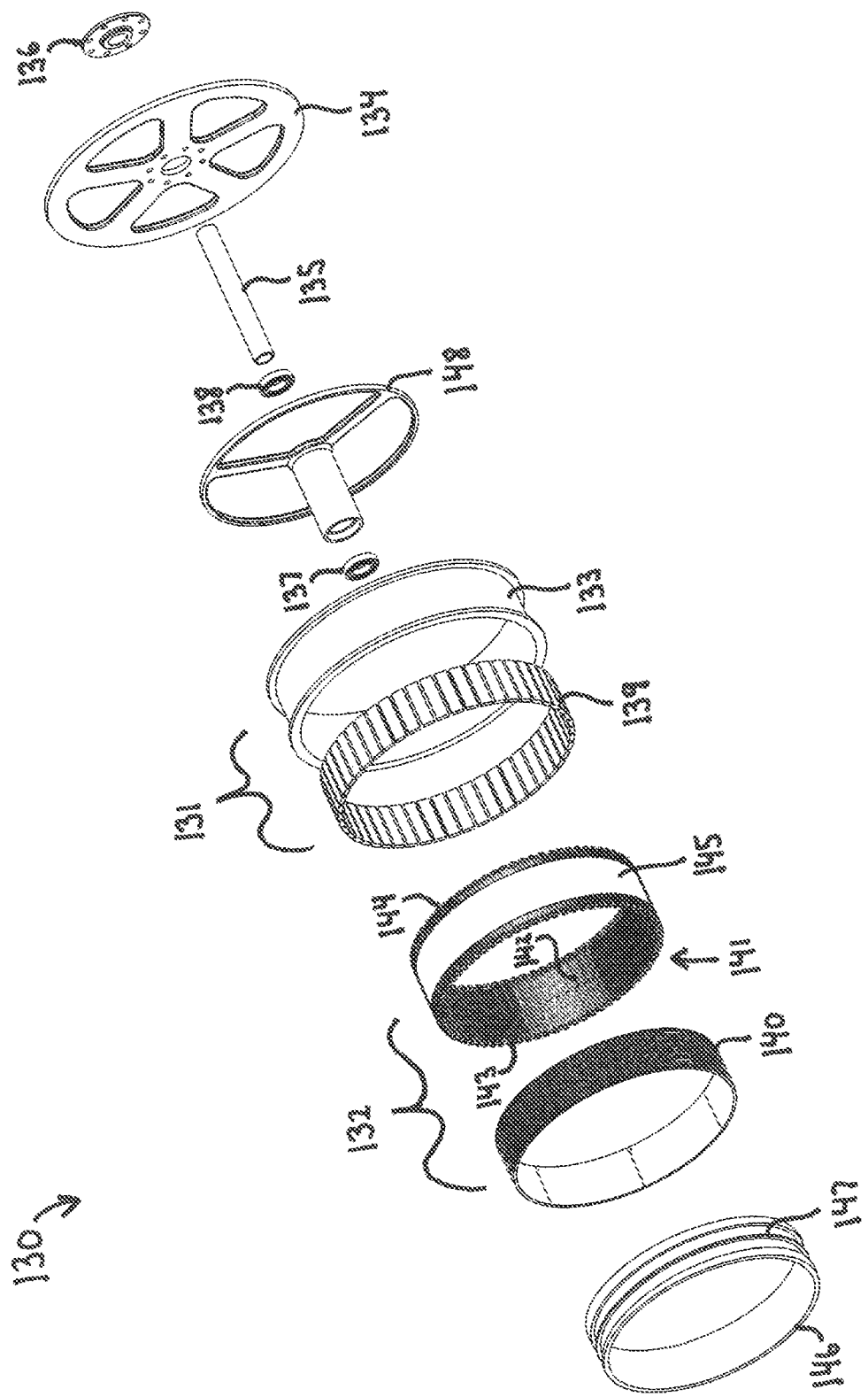
FIG. 5 is an exploded isometric view drawing of a high efficiency radial gap, outer rotor electric machine in accordance with the invention.

An exploded isometric view drawing of a high efficiency radial gap, outer rotor electric machine in accordance with the invention is shown in FIG. 5. Radial gap versions of the electric machine may be constructed with a traditional inner rotor or with an outer rotor topology as shown. For some applications including those where the rotor must operate to higher tip speeds for greater power density, it can be preferable to use an outer rotor construction. In this configuration, the permanent magnets 139 are naturally contained by the rotor backiron 133 without a reinforcement band required inside the magnetic airgap, that would reduce performance. The motor 130 is comprised of a rotor 131 and a stator 132. The rotor 131 has an outer rotor backiron 133 comprised of iron or steel preferably with high permeability to reduce weight and fifty inner radially alternating permanent magnet poles 139, as shown. Alternatively, a Halbach array of magnets 139 could be used and rotor backiron 33 be constructed of carbon fiber composite, however we have found that this alternate configuration is not preferable because it provides no practical performance benefit while greatly increasing manufacturing complexity and costs. The rotor backiron 133 attaches to a hub 134 that connects to center rotating shaft 138 by hub plate 136. The stator 132 is constructed of a thin ring stator backiron 140 of non-oriented silicon steel laminations, formed from assembled individual arc segments prior to windings, and Litz wire windings 141 applied to the outer diameter directly by traversing adhering in the winding pattern by already tacky adhesive layer. The tacky adhesive layer resists forces during formation of the windings 141 and later resists electromagnetic forces for generation of torque in operation. After the windings 141 are adhered with active lengths 143 directly to the outside circumferential surface of the stator backiron 140, a layer of fiberglass epoxy tow preg band 145 is tension wrapped around the outer diameter compressing the windings. The stator 132 is then oven post cured to increase the bond strength of the adhesive layer and cure the band 145. The windings 141 are wound from wire constructed of bundled individually insulated strands. In the motor 130 shown, on top of the enamel insulation on the strands is also a thermoplastic coating making the strands self-bondable to each other. Before operation of the motor 130, the windings 141 are also electrically heated through resistance heating to higher temperature such that the end turns 143, 145 become more rigid through the strands self-bonding to each other. Inside the stator backiron is a cooling jacket 146 with cooling channels 147 that connects to a stator hub 148. The stator hub 148 journals the rotor shaft 135 through bearings 137, 138. The cooling jacket 146 also comprises the support for the stator backiron 140 that transfers torque.

Figure 6:
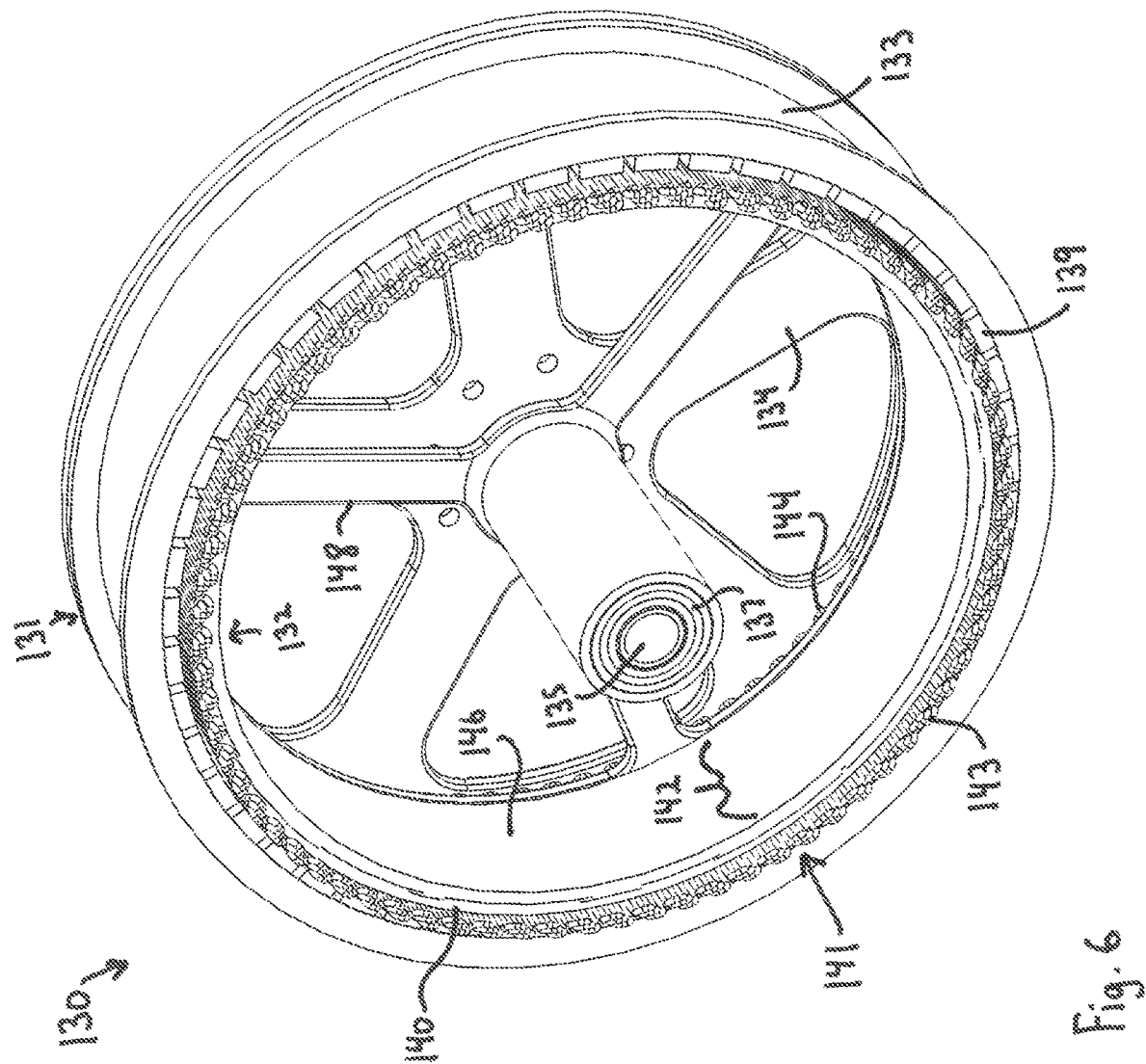
FIG. 6 is an isometric view drawing of the high efficiency electric machine of FIG. 5.

An isometric view drawing of the high efficiency electric machine of FIG. 5 is shown in FIG. 6. The motor 130 provides very high power density with record high efficiency through the use of an outer rotor ring construction. The motor 130 comprises a rotor 131 and internal stator 132. The rotor backiron 133 contains fifty radially alternating permanent magnets 139 resisting centrifugal loading and conducting magnetic flux circumferentially between magnets 139. The stator 132 is located radially inside the rotor 131 and comprises a radially thin lamination stack as the stator backiron ring 140. The stator backiron is slotless and smooth. Windings 141 are applied directly to the smooth outer surface of the stator backiron 140 though a film adhesive applied that allows winding of the pattern adhering directly and instantaneously for low cost high speed production. The axial active lengths 142 are directly adhered to the stator backiron 140, and end turns 143, 144 located outside of the magnetic airgap between rotor backiron 133 and the stator backiron 140. Rotor hub 134 couples the rotor backiron 133 to a center shaft 135. Stator hub 148 connects to the cooling jacket 146 inside the stator backiron 140 to the bearings 137, 138 that journal the rotor shaft 135. The motor 130 is driven by a synchronous variable speed inverter (shown in FIG. 12) that couples to armature windings 141.

Figure 7:
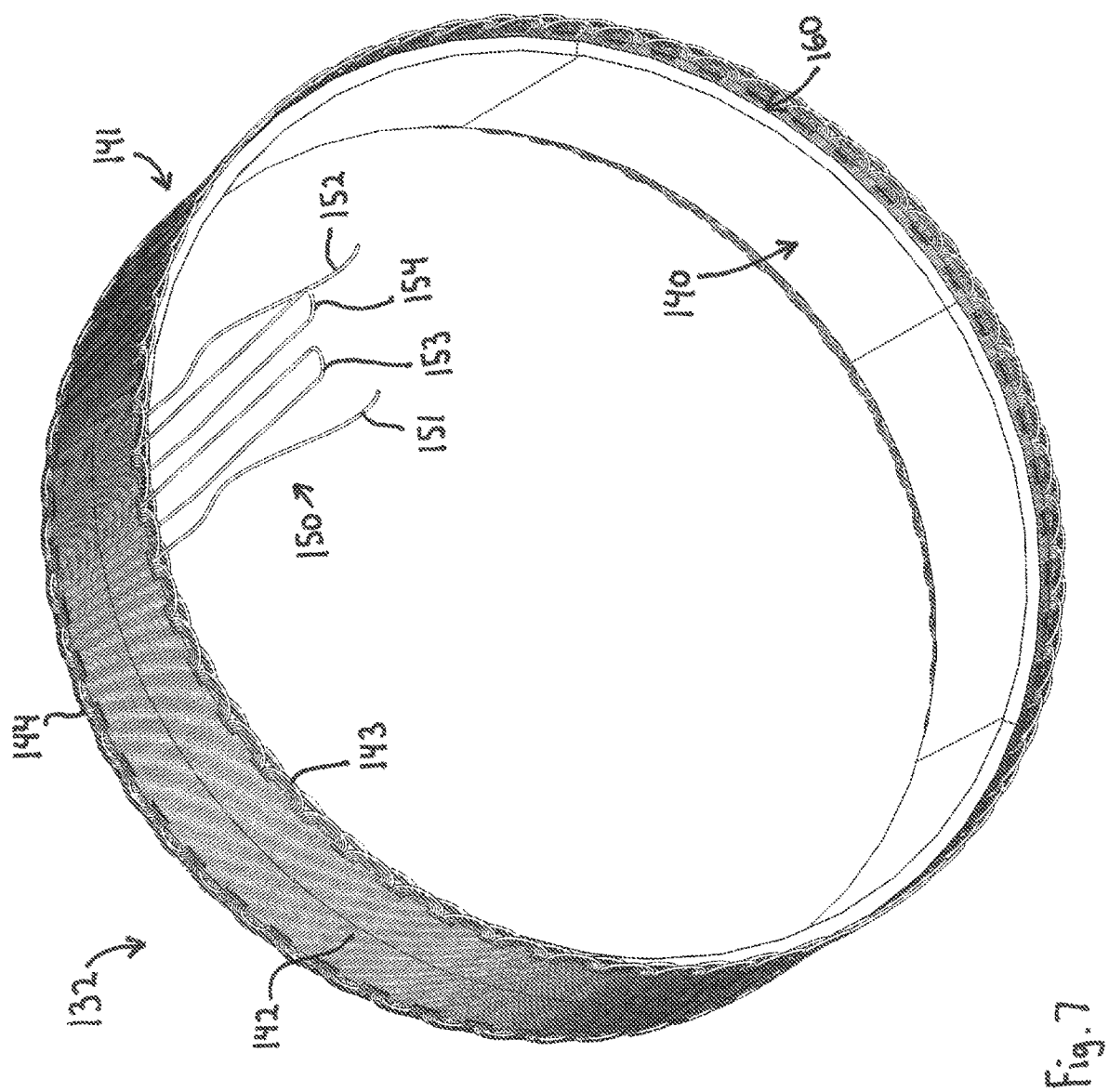
FIG. 7 is an isometric view drawing of the stator (after winding) of the high efficiency electric machine of FIG. 5.

An isometric view drawing of the stator (after winding) of the high efficiency electric machine of FIG. 5 is shown in FIG. 7. The stator 132 comprises the stator backiron 140 with outer layer of film adhesive 160 applied, preferably prior to winding the windings 141 directly to the surface, wherein the adhesive and stator backiron resist the winding forces so as to hold the required pattern for electromagnetic force generation. Especially for large diameter electric machines with high pole counts, the stator backiron 140 is preferably constructed by assembling the backiron ring 140 from multiple individual arc segments prior to applying the windings. The active lengths 142 of the windings 141 that produce electromagnetic force are adhered to the inner surface of the magnetic airgap, namely, the outer surface of the stator backiron 140 to also transfer torque from the windings in operation as well as efficiently transfer the resistive and eddy current heat generation by thermal conduction from the windings 141 to the stator backiron 140. The windings 141 could be wound as individual coils, however they are more preferably wound as serpentines (as shown) with multiple turns of a phase winding accomplished through traversing multiple passes around the circumference. The individual phases of the armature windings 141 may be wound separately or can be wound consecutively (as shown) yielding leads 150 with only two ends 151, 152 and two phase transitioning loops 153, 154.

Figure 8:
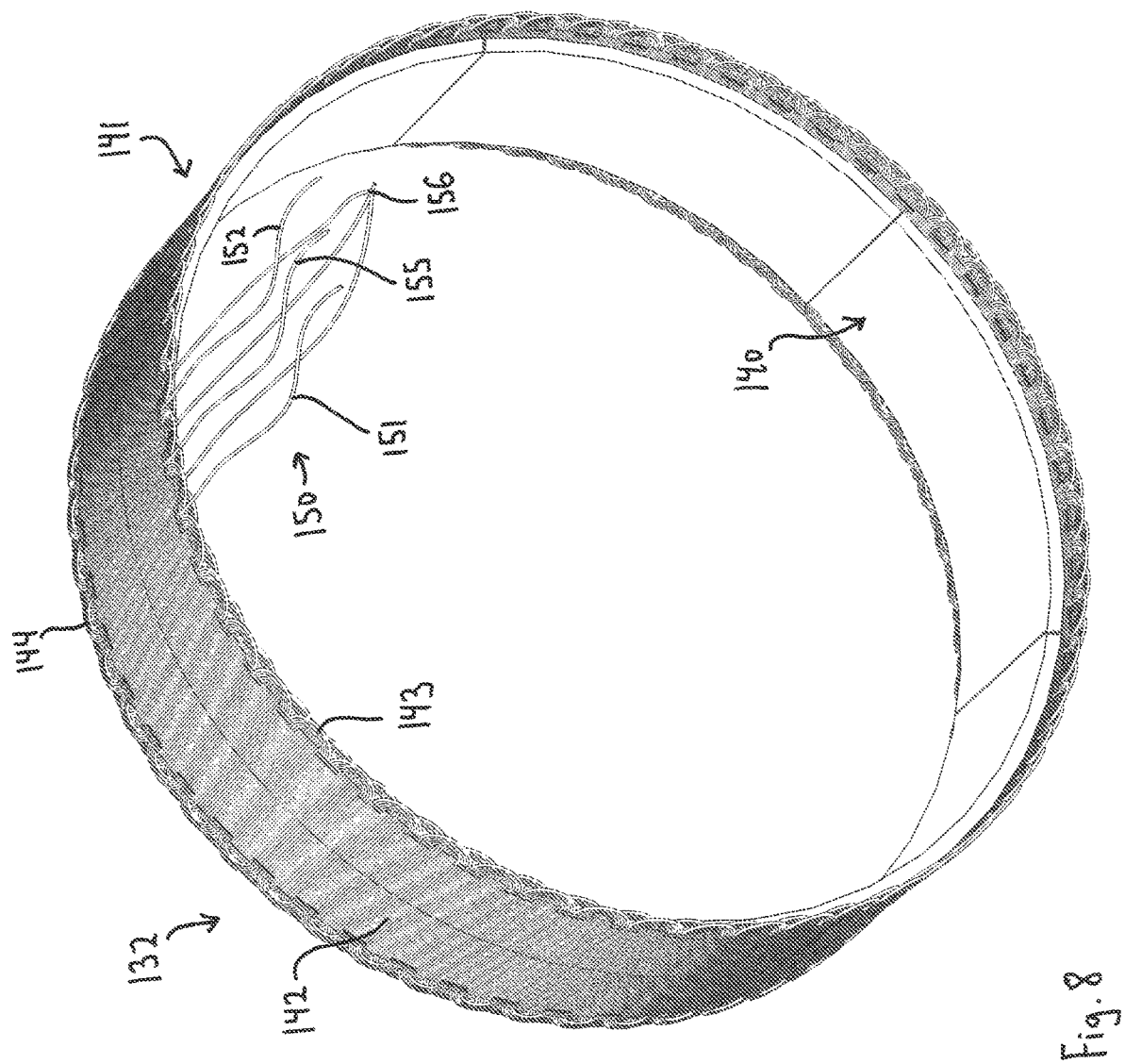
FIG. 8 an isometric view drawing of the stator (after windings connected into three phases) of the high efficiency electric machine of FIG. 5.

An isometric view drawing of the stator (after windings connected into three phases) of the high efficiency electric machine of FIG. 5 is shown in FIG. 8. After winding and post curing of the windings 141 to the stator backiron 140, the leads 150 are cut and connected to yield three phase leads 151, 152, 155 and a center wye connection 156.

Figure 9:
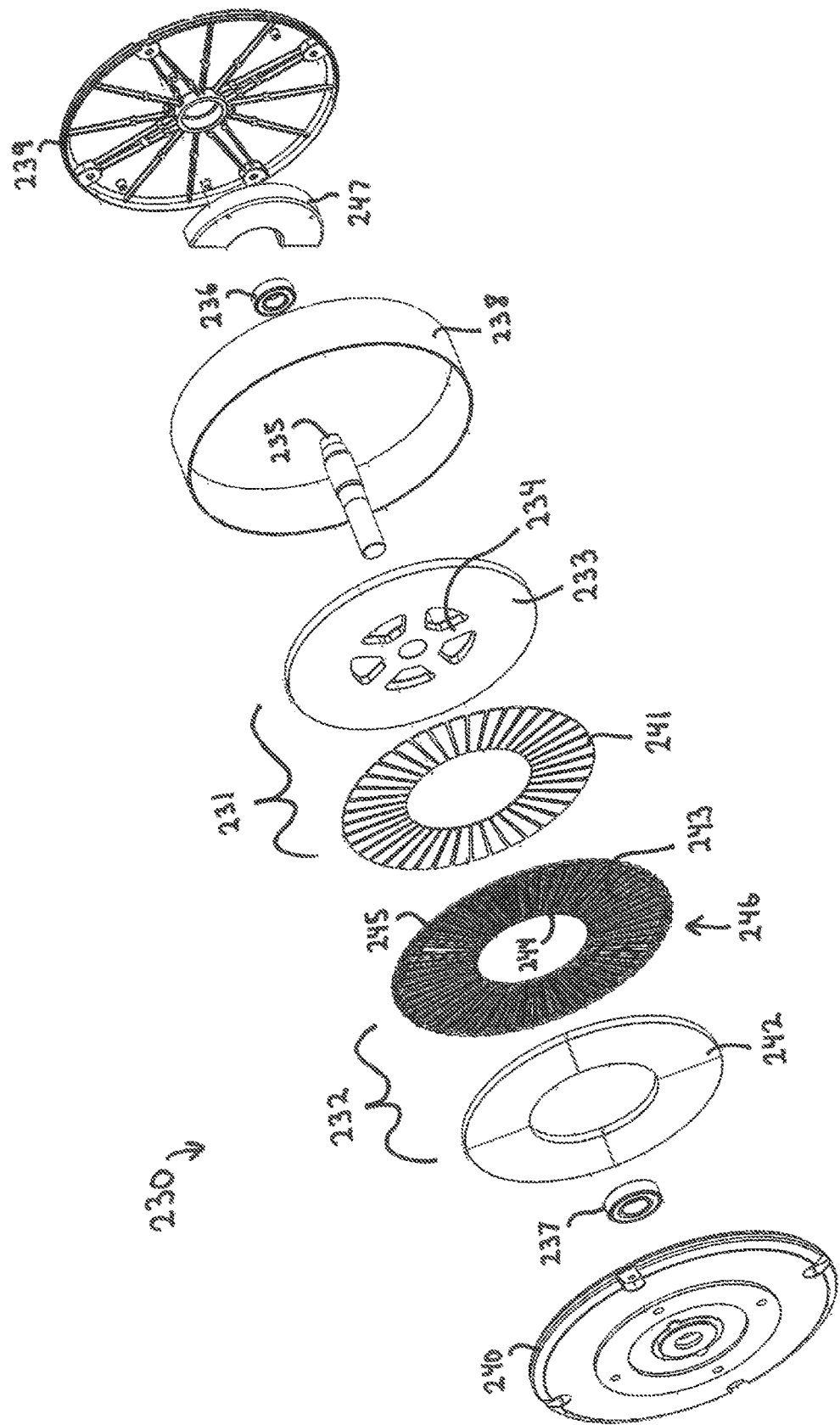
FIG. 9 is an exploded isometric view drawing of a high efficiency axial gap electric machine in accordance with the invention.

The new electric machines may utilize the more traditional radial magnetic airgap structure as previously shown, or can also be made with an axial airgap structure for axially thinner pancake geometry. An exploded isometric view drawing of a high efficiency axial gap electric machine in accordance with the invention is shown in FIG. 9. The motor 230 comprises a disc rotor 231 and stator 232. The rotor 231 is constructed of a steel disc rotor backiron 233 with center hub portion 234 that attaches to center shaft 235. The shaft 235 rotates inside bearings 236, 237 which are mounted in housing end plates 239, 240 connected by housing tube 238. On the rotor backiron 233 is an array of alternating polarity axial permanent magnets 241 that drive magnetic flux circumferentially through the rotor backiron 233 and across a magnetic airgap to the stator 232. The airgap is defined as the space between facing surfaces of the rotor backiron 233 and a stator backiron 242. The stator 232 is comprised of the stator backiron 242 of pressed powdered iron alloy which precludes incurring significant magnetic-induced losses from the magnetic flux of the rotating rotor 231. The stator backiron 242 is constructed from multiple individual arc segments that are assembled into a continuous slotless ring onto which the windings are wound. The housing endplate 240 also comprises the support for the stator backiron 242 that transfers torque. Besides reducing waste, this construction reduces the press force and tooling requirements for manufacture of the stator backiron 242. Flexible Litz wire windings 246 are applied directly to the stator backiron 242 through application of adhesive prior to forming and simultaneously adhering the windings 246. Active lengths 243 run radially and produce torque when electrically energized, and are adhered to the stator backiron 242, while end turns 244, 245 are located beyond the inner and outer diameters of the stator backiron 242. The windings 246 are electrically energized by a synchronous electronic motor drive inverter 247 located inside the housing 238.

Figure 10:
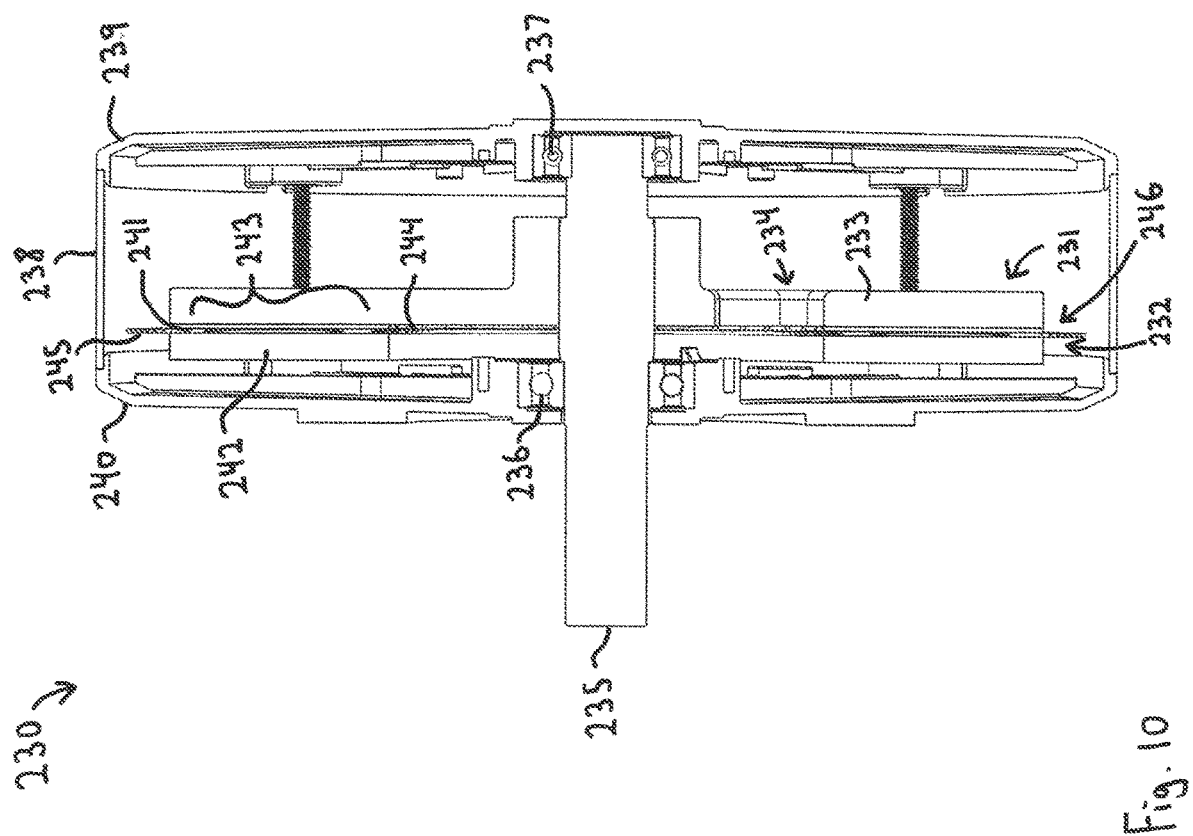
FIG. 10 is a side view drawing of the high efficiency electric machine of FIG. 9.

A sectional side elevation of the high efficiency electric machine of FIG. 9 is shown in FIG. 10. The motor 230 comprises a rotor 231 axially adjacent to a stator 232. Axial permanent magnets 241 attached to the steel rotor backiron 233 drive magnetic flux across an axial airgap containing windings 246 adhered to a stator backiron 242. The rotor backiron 233 has an integral hub 234 that is interference fit with shaft 235. Bearings 236, 237 support the shaft 235 and are mounted with housing endplates 239, 240 and housing tube 238. The airgap windings 246 comprise radial active length portions 243 that are applied to the stator backiron 242 by forming the winding pattern directly on to the surface using a pre-applied tacky adhesive to maintain the pattern and resist forces of the winding process. The stator backiron 242 is preferably constructed from Sendust. Although Sendust is brittle, the simple ring shape without pole teeth allows it to uniquely be utilized in the electric machine. Likewise, the narrow thickness, large annular magnetic airgap from the air core construction negates deficiency from the lower relative permeability compared with silicon steel laminations or powdered iron construction.

Figure 11:
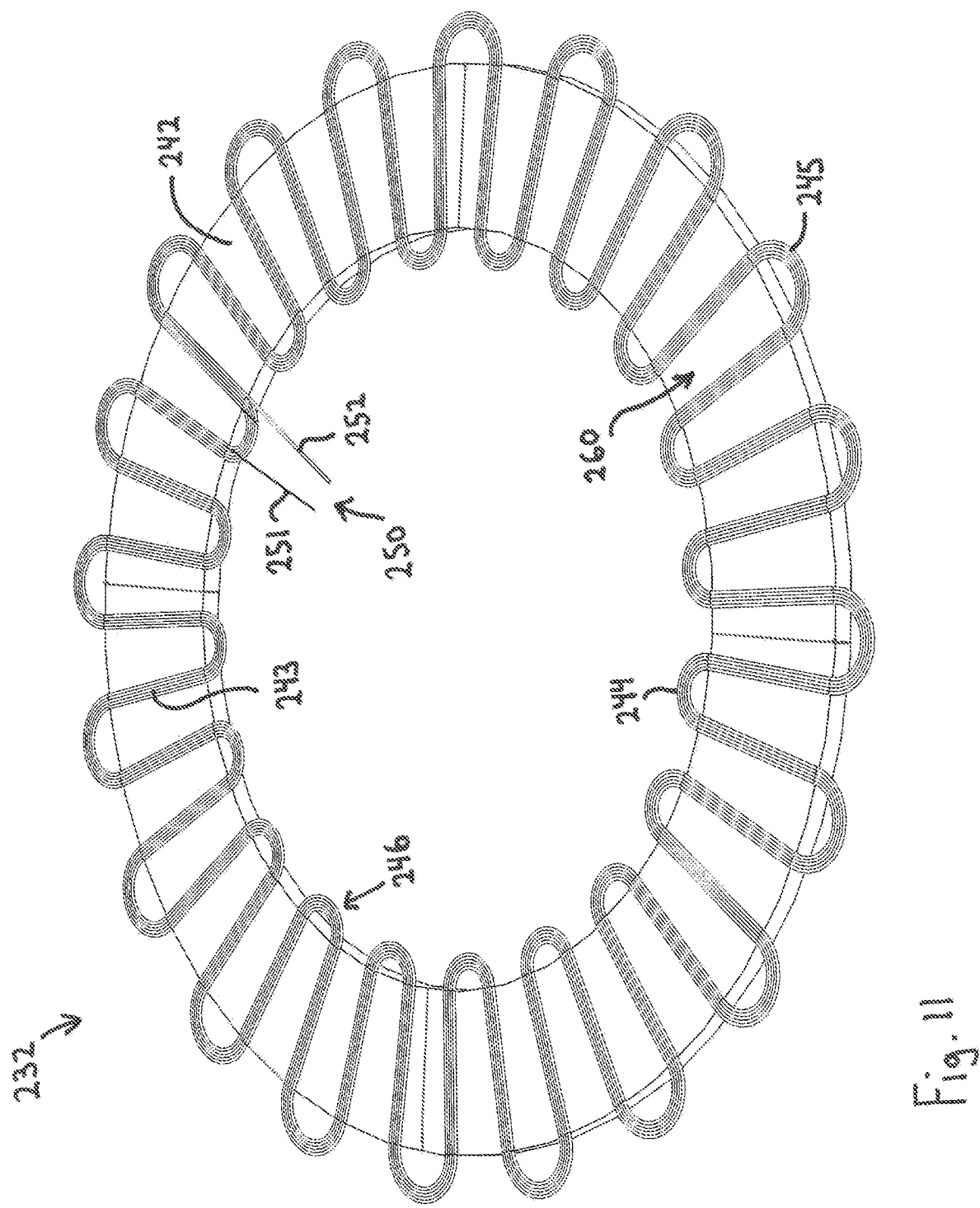
FIG. 11 is an isometric view drawing of the stator (with only a single phase winding completed) of the high efficiency electric machine of FIG. 9.

An isometric view drawing of the stator 232 (with only a single phase winding completed) of the high efficiency electric machine of FIG. 9 is shown in FIG. 11. The stator 232 is comprised of loss mitigating ferromagnetic material, preferably Sendust which is a combination of iron, silicon and aluminum. We have found that the material can uniquely be utilized in the simple stator backiron ring structure, has sufficient relative permeability uniquely compatible with the large annular airgap of the air core motor topology and simultaneously has low magnetic loss density at the desired fundamental frequencies of between 800 and 2400 Hz, and more preferably between 1000 and 1500 Hz. These ranges of fundamental frequencies corresponds to the number of magnetic poles and operating speed and specially correspond to achieving light weight construction with minimal end turn length and winding eddy current losses by being much higher than 50-60 Hz traditional electric machines, or 400 Hz for those traditionally utilized in the aircraft industry. The stator backiron 242 is first assembled into a completed ring from multiple individual arc pieces, then a tacky film adhesive layer 260 is applied on the airgap facing surface. The flexible multiple individually insulated strand conductor wire is then adhered in the undulating serpentine winding pattern to form the windings 246. The windings 246 comprise radial active lengths 243 and end turns 244, 245. After winding, the adhesion may be further increased for transmission of electromagnetic force on the windings 246 by heating and post curing. The single phase winding 246 shown is wound continuously and preferably only has two leads 251, 152.

Figure 12:
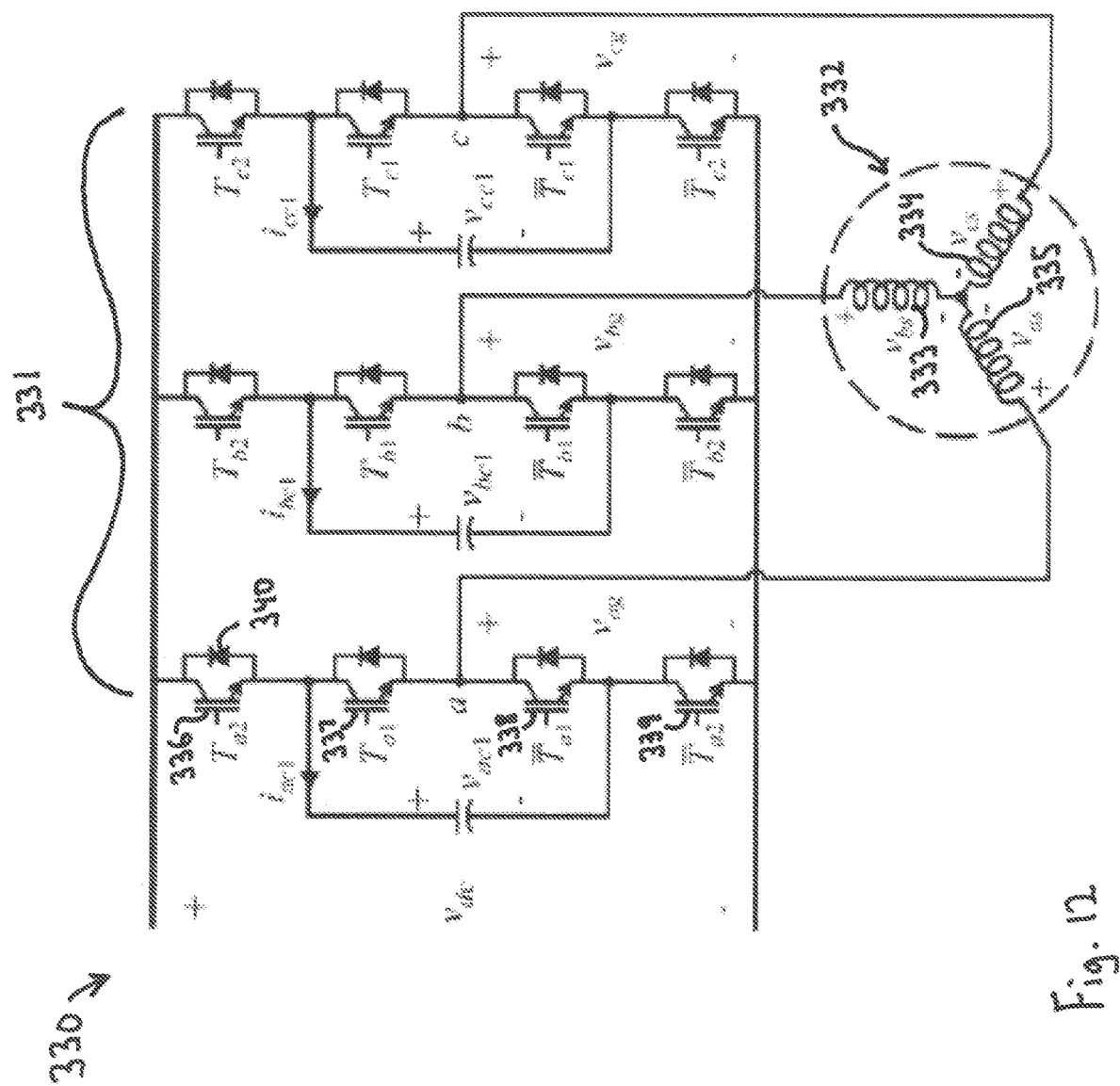
FIG. 12 is a schematic drawing of variable frequency, synchronous inverter for use driving high efficiency electric machines as motors in accordance with the invention.

The electrical machine uses a variable frequency electronic drive inverter when operated as a motor. Different drive configurations can be utilized including the most common which is a two stage inverter employing pulse width modulation. We have found that more preferable configurations are ones that can reduce transistor switching losses. One way this can be accomplished by reducing the switching frequency of the transistor devices for the fundamental frequency of the motor. However, the air core topology of the new electric motors has very low inherent winding inductance and hence can result in large undesirable ripple currents if modulated at lower frequencies. These high ripple currents would cause other unsatisfactory motor and drive losses. More preferably, reduced switching losses can also be accomplished through use of either a resonant switched drive or use of a multilevel (3 or more level) inverter. A schematic drawing of variable frequency, synchronous inverter for use driving high efficiency electric machines as motors in accordance with the invention is shown in FIG. 12. As shown, the electronic variable frequency drive 330 comprises a three level inverter 331. Transistor switches 336, 337, 338, 339 are switched to provide stepped voltage waveforms to the phase windings 333, 334, 335. Freewheeling diodes 340 are coupled across each of the transistor switches 336, 337, 338, 339. Series connected flying capacitors 340 clamp the transistors 336, 337, 338, 339. The overall result of the topology is that high frequency modulation is provided with lower inherent switching losses. This accomplishes the benefit of combined higher efficiency motor operation with higher efficiency compatible and cooperating electronic drive inverter operation.

Figure 13:
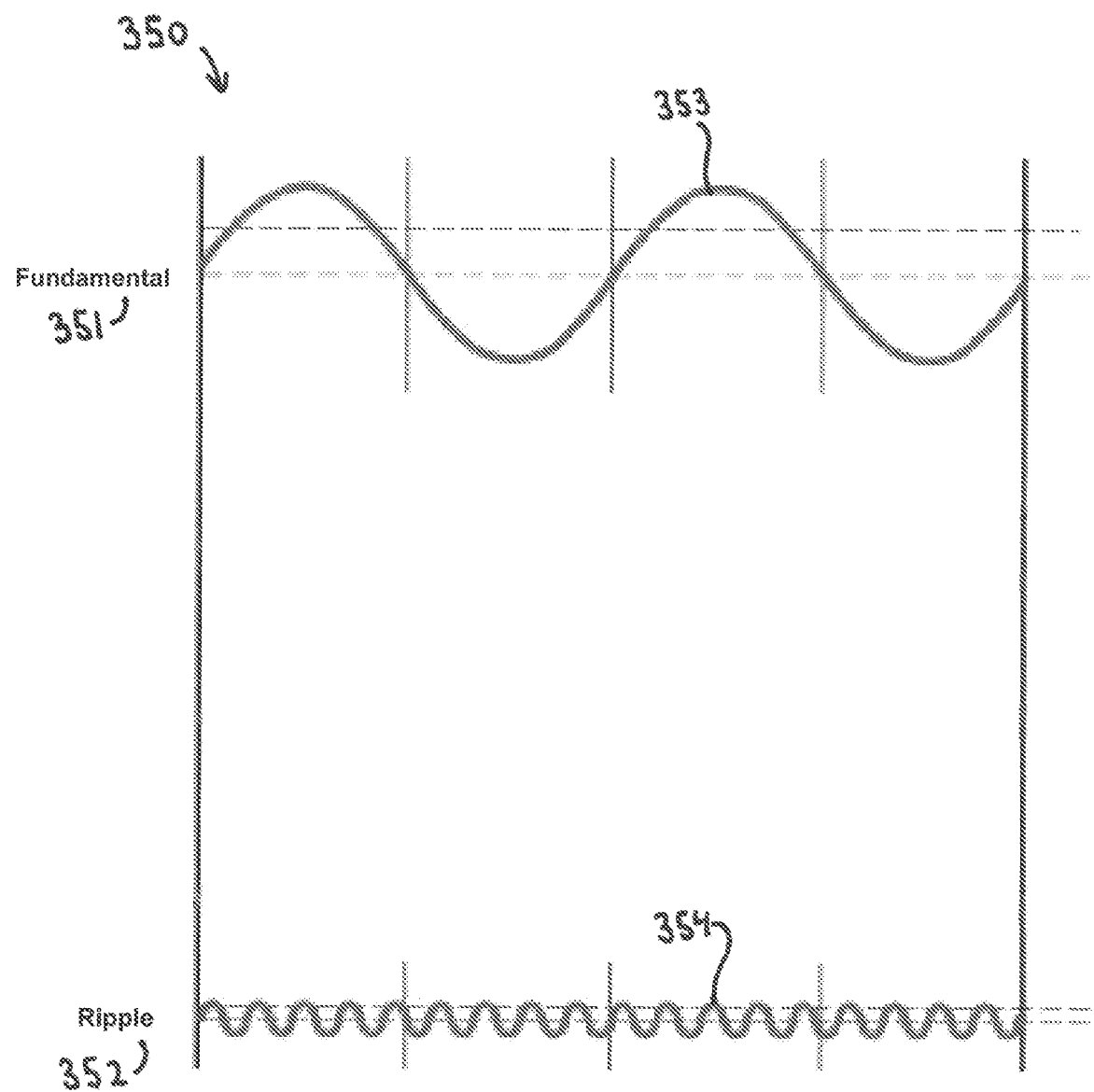
FIG. 13 is a plot of the fundamental and ripple electromagnetic flux components in a high efficiency electric machine driven the a variable frequency, synchronous inverter in accordance of FIG. 12.

A plot of the fundamental and ripple electromagnetic flux components in a high efficiency electric machine driven by a variable frequency, synchronous inverter in accordance with FIG. 12 is shown in FIG. 13. The electromagnetic flux components in the electric machine are a function of the electric currents supplied by the electronic drive inverter. The fundamental flux 351 is driven by the rotating permanent magnets with large fundamental amplitude 353 and the electronic drive supplies current synchronous with this fundamental rotor flux. However, the current from the drive also contains higher frequency current ripple, from voltage/current regulation, which induces ripple magnetic flux 352 with a smaller ripple amplitude 354. For both high motor and electronic inverter drive efficiencies, it is preferable to maintain the ripple magnetic flux amplitude 354 to be as small as possible, and higher frequency modulation is effective for maintaining the ripple to be sufficiently small.

In the electric machines in accordance with the invention, the stator backiron in the machines uniquely serve five different functions. Schematic drawings of a circumferential section portion of rotor and stator illustrating the five different functions of the stator backiron of a high efficiency electric machines in accordance with the invention are shown in FIGS. 14A-14E. The first function is holding the winding pattern through shear adhesion during the winding process as shown in FIG. 14A. The motor section 450 is comprised of the rotor backiron 451 with attached permanent magnet poles 452 and stator backiron 454 across the magnetic airgap 470. Windings 454, comprised of wire formed from bundled individually insulated conductor strands electrically connected in parallel but electrically insulated along their length inside the magnetic airgap, are wound by adhering as traversed to the stator backiron 453 through a film adhesive 455 applied prior to winding. During the winding process, the windings are dispensed and adhered through tacky adhesive layer 455. The stator backiron 453 through the film adhesive 455 provides resistance force 456 that holdings the winding pattern and resists against forces and tension during the winding process.

The stator backiron 453 secondly provides magnetic conduction of the permanent magnet flux in the motor 450. The permanent magnet flux conduction is shown in FIG. 14 B. The permanent magnet poles 452 attached to the rotor backiron 451 drive magnetic flux 457 across the magnetic armature airgap 470, through windings 454. The stator backiron 453 conducts the permanent magnet flux 457 circumferentially completing the loop back through the windings 454 and back across the armature airgap 470. The permanent magnet flux 457 varies oscillates at the fundamental frequency from the number of rotor poles 452 (preferably between 30-60) and rotating speed. The stator backiron can be constructed of thin silicon steel laminations of 0.10" thick or less, or from compressed ferromagnetic powder. A surprisingly preferred material, which is typically utilized for inductor applications, is Sendust. The iron, silicon, aluminum alloy matches because of its unique combined low power loss density at the fundamental frequency range of the new motors, adequate magnetic saturation flux density for the motors operating flux density, acceptable magnetic permeability due to the large airgap from air core topology and use of a simple ring stator backiron geometry that can tolerate the material lower toughness. Sendust has a relative magnetic permeability of 125 which is significantly lower than carbon steels, usually ranging between 700-1500. As shown in the motor 450, the stator backiron 453 is mounted inside a carbon steel housing 458. Due to the higher permeability of the housing 458, the permanent magnet flux 457 would have a tendency to travel to and circumferentially through the housing 458. This would cause unacceptable magnetic-induced losses to occur in the housing 458. To prevent this from occurring and to achieve high efficiency, a higher reluctance container 459 is used to surround the stator backiron 453. The high reluctance container preferably has a lower relative magnetic permeability than that of the material of the stator backiron 453. It can comprise an adhesive layer or non-ferromagnetic separator ring. The permanent magnet flux 457 as a result stays in the stator backiron 457 for low loss conduction and does not significantly traverses into any outer surrounding steel.

A third function of the stator backiron in the electric machines is conduction of electromagnetic flux from the electrical currents in the windings, as shown in FIG. 14 C. The windings active lengths 454 are adhered to the stator backiron 453 through the film adhesive 455. As the electronic synchronous inverter drives current through the windings 454, the windings produce circular electromagnetic flux 460 around each individual wire. The electromagnetic flux 460 comprises both fundamental flux and ripple magnetic flu. The stator backiron 453 conducts the electromagnetic flux 460 over part of the loop at the surface of the magnetic airgap 470. This provides the benefit of increasing phase winding inductance which reduces current harmonics and associated losses.

In the operation of the electric machines either as motors or generators, current through the windings of the stator interacts with the magnetic flux from the rotor for the production or relative torque. A fourth function of the stator backiron 453 is shear transfer of magnetic force 461 generated by the windings 454 through the film adhesive layer 455 to the surface. As the magnetic flux alternates polarity from the magnetic poles 452, the active lengths 454 in the magnetic airgap 470 adjacent the poles 452 alternate in current direction. The wires of active lengths of two different phases thereby produce the magnetic forces 461 in the same direction. The sum of all the active length windings 454 around the circumference of the motor 450 add together to a total, of which an identical total reaction force 462 is exerted to the rotor magnets and backiron 452, 451. This reaction force 462 exerted at the radius location of the magnetic airgap 470 equates to the torque produced by the motor 250 when driven by the electronic synchronous motor drive inverter.

A fifth function of the stator backiron is transfer of the resistive and eddy current heat generated by the air core windings 454 away from the magnetic airgap 470 by thermal conduction as shown in FIG. 14 E. Air core electric machines employing double rotor topologies have low heat power removal capability due to being limited to convection only. With the single rotor construction machine 450, the stator backiron provides dramatically increased heat power removal through thermal conduction 463. Even with high efficiency, the power loss in the windings 454 must be removed in order to maintain allowable operating temperature. The power loss form the windings 454 is conducted 463 through the film adhesive 455 through the stator backiron 453 in the direction away from the magnetic armature airgap 470. The stator backiron 453 heat conduction 463 transfers to the outer container and housing 458 for removal.

Figure 15:
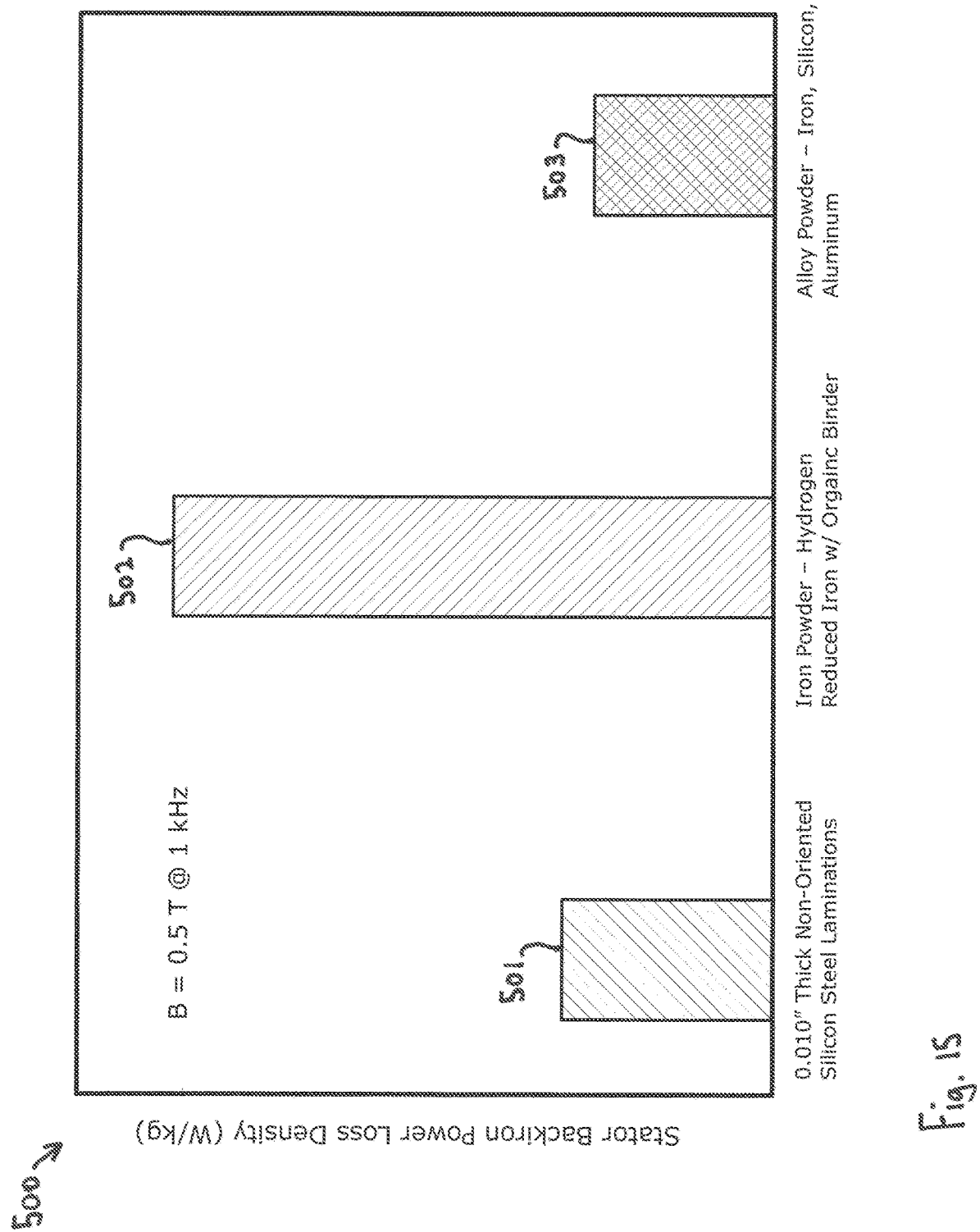
FIG. 15 is a comparison chart of the stator backiron power loss densities for different materials and constructions for use in electric machines in accordance with the invention.

Due to the high efficiency of the combination of permanent magnet excitation and low loss winding construction, the magnetic induced losses in the stator backiron can become a significant portion of the total electric machine losses. It is desirable to reduce stator backiron magnetic induced losses at the fundamental operating frequency and flux density while simultaneously maintaining low costs. Preferably the largest elemental component in the stator backiron comprises low cost iron. Highest efficiencies can be achieved using material comprising high percentages of nickel, however this is too costly for the majority of practical applications and is not considered preferable. Many conventional electric motors operating in at 50 or 60 Hz fundamental frequencies employ silicon steel laminations with individual thickness of around 0.025". To accommodate the higher frequencies of the new electric machines in accordance with the invention, such laminations can be used but with reduced thickness of 0.010" of less for low losses. A comparison chart of the stator backiron power loss densities for different materials and constructions for use in electric machines in accordance with the invention is shown in FIG. 15. The comparison of the stator backiron power loss density 500 shows a 0.010" thickness silicon steel lamination stack achieves losses of 14 W/kg when driven a t a fundamental flux density and frequency of 0.5 T at 1 kHz. A lower cost alternative construction comprises the use of compressed iron powder. A stator backiron comprised of hydrogen reduced iron powered with organic binder 502 unfortunately achieves 40 W/kg. This level of losses is higher than desirable in many cases. A second alternative material which is preferred is Sendust. The Sendust stator backiron 503 has similar costs as the powdered iron 502 while simultaneously having slightly lower power loss density than the silicon steel laminations 501.

Obviously, numerous modifications and variations of the described preferred embodiment are possible and will occur to those skilled in the art in light of this disclosure of the invention.

Accordingly, I intend that these modifications and variations, and the equivalents thereof, be included within the spirit and scope of the invention as defined in the following claims, wherein we claim:

1. An electric machine for converting between electrical and rotary mechanical energy comprising:
   a rotor and a stator wherein said rotor is journaled to rotate about an axis of rotation, said stator is stationary adjacent to said rotor and includes a slotless ferromagnetic stator backiron ring having air core armature windings that are adhered to a surface thereof, said windings magnetically exert torque upon said rotor across a magnetic armature airgap between a rotor backiron on said rotor and said stator backiron surface in response to electric power applied to said windings;
   said rotor comprising permanent magnets on said rotor backiron that generate magnetic flux across said magnetic armature airgap and through said air core armature windings;
   said air core armature windings are comprised of pre-bundled multiple individually insulated conductor strands that are electrically connected in parallel but are electrically insulated from each other along their lengths inside said magnetic airgap;
   said conductor strands are enclosed by a serve that holds said strands together;
   said serve of said windings is bonded to said armature airgap surface of stator backiron;
   said stator backiron ring is assembled to form a completed ring from individual arc pieces, and said air core armature windings are adhered to said completed backiron ring;
   said stator back iron ring is coupled to a support for transfer of torque to said support, said support providing higher magnetic reluctance to said magnetic flux in the circumferential direction than said stator back iron.

2. An electric machine as described in claim 1 wherein: said arc pieces are formed from pressed ferromagnetic powder comprised predominately of iron.

3. An electric machine as described in claim 2 wherein: said pressed ferromagnetic powder additionally comprises aluminum.

4. An electric machine as described in claim 1 wherein: said air core windings are applied to said stator backiron through a pre-applied adhesive on said armature airgap surface.

5. An electric machine as described in claim 1 wherein: said individually insulated conductor strands comprise a self-bonding top coat adhesive wherein when activated said strands are bonded with each other inside said serve but remain unbonded with adjacent winding turns.

6. An electric machine as described in claim 5 wherein: said self-bonding coating holds said air core windings in a thinner layer than when initially applied to said stator backiron after being pressed against said stator backiron while said self-bonding coating is activated.

7. An electric machine as described in claim 1 wherein: said air core windings comprise multiple phases which lie in a single layer against said stator backiron in portions where inside said magnetic armature airgap.

8. An electric machine for converting between electrical and rotary mechanical energy comprising:
   a rotor and a stator wherein said rotor is journaled to rotate about an axis of rotation, said stator is stationary adjacent to said rotor and magnetically exerts torque upon said rotor across a magnetic armature airgap in response to applied electric power;
   said stator includes a ferromagnetic stator backiron, and said rotor comprises a rotor backiron having attached permanent magnets that generate magnetic flux across said magnetic armature airgap, defined between facing surfaces of said stator backiron and said rotor backiron and through air core stator windings that are bonded to said ferromagnetic stator backiron on the surface thereof facing said magnetic armature airgap;
   said air core armature windings are comprised of pre-bundled multiple individually insulated conductor strands that are bonded to said armature airgap surface of stator backiron and are electrically connected in parallel but are electrically insulated from each other along their lengths inside said magnetic armature airgap;
   said stator backiron transfers heat generated by armature winding resistive losses by thermal conduction away from said magnetic armature airgap, transfers electromagnetically induced torque on said armature windings through adhesive shear to a stator backiron support, conducts magnetic flux circumferentially between rotating magnetic poles, conducts part of the magnetic flux path around individual armature windings which increases phase winding inductance, and holds said armature windings in the winding pattern during forming of said winding pattern through adhesion to a pre-applied adhesive layer.

9. An electric machine as described in claim 8 wherein: said stator backiron is formed from individual arc pieces, wherein said arc pieces are assembled into a completed slotless ring to which said said air core armature windings are adhered.

10. An electric machine as described in claim 9 wherein: said arc pieces are formed from pressed ferromagnetic powder predominately comprising iron.

11. An electric machine as described in claim 10 wherein: said pressed ferromagnetic powder additionally comprises aluminum.

12. An electric machine as described in claim 8 wherein: said stator back iron transfers torque to a support that provides higher magnetic reluctance to said magnetic flux in the circumferential direction than said stator back iron.

13. An electric machine as described in claim 8 wherein: said air core windings comprise multiple phases which lie in a single layer against said stator backiron in portions where inside said magnetic armature airgap.

14. An electric machine as described in claim 8 wherein:
said individually insulated conductor strands comprise a self-bonding top coat adhesive that can be activated to adhere said conductor strands together in a thin layer when said windings are pressed against said stator backiron.

15. An electric machine for converting between electrical and rotary mechanical energy comprising:

a rotor and a stator wherein said rotor is journaled to rotate about an axis of rotation, said stator is mounted stationary adjacent to said rotor and having a ferromagnetic stator backiron with a surface facing said rotor across a magnetic airgap, said stator backiron having windings applied in a winding pattern formed directly onto said stator backiron and adhered to said backiron surface with a pre-applied tacky adhesive, said windings magnetically exert torque upon said rotor across said magnetic armature airgap in response to electric power applied to said windings;

said rotor comprising permanent magnets that generate magnetic flux across said magnetic armature airgap and through said air core stator windings that are bonded to said ferromagnetic stator backiron surface facing said magnetic armature airgap;

said air core armature windings are comprised of pre-bundled multiple individually insulated conductor strands that are electrically connected in parallel but are electrically insulated from each other along their lengths inside said magnetic armature airgap;

said stator backiron transfers heat, generated by armature winding resistive losses, by thermal conduction in the direction away from said magnetic armature airgap, transfers electromagnetically induced torque on said armature windings through adhesive shear to a stator backiron support, conducts magnetic flux circumferentially between rotating magnetic poles, and is supported by a support to transfer torque that provides a higher magnetic reluctance to said magnetic flux in the circumferential direction than said stator back iron.

16. An electric machine as described in claim 15 wherein:
multiple turns of a phase winding are formed continuously by traversing multiple passes around said stator backiron.

17. An electric machine as described in claim 15 wherein:
said individually insulated conductor strands comprise a self-bonding top coat adhesive wherein said top coat adhesive is activated while said windings are pressed against said stator backiron.

18. An electric machine as described in claim 15 wherein:
said stator backiron is formed from individual arc pieces assembled together into a completed ring, wherein said air core armature windings are adhered onto said ferromagnetic stator backiron surface facing said magnetic armature airgap.

19. An electric machine as described in claim 18 wherein:
said stator backiron comprises pressed ferromagnetic powder of iron, silicon and aluminum.

20. An electric machine as described in claim 15 wherein:
said conductor strands of said windings are enclosed by a serve that holds said strands together wherein said serve is bonded to armature airgap surface of stator backiron.

\* \* \* \* \*